US012571471B2

(12) United States Patent
Somos et al.

(10) Patent No.: US 12,571,471 B2
(45) Date of Patent: Mar. 10, 2026

(54) CONTROL ARRANGEMENT AND METHOD FOR CONTROLLING A POWERTRAIN OF A VEHICLE

(71) Applicant: Scania CV AB, Södertälje (SE)

(72) Inventors: Oliver Somos, Hägersten (SE); Henrik Sandstedt, Hägersten (SE); Frank Mohr, Värmdö (SE); Mikael Alenius, Segeltorp (SE)

(73) Assignee: Scania CV AB, Södertälje (SE)

( * ) Notice: Subject to any disclaimer, the term of this patent is extended or adjusted under 35 U.S.C. 154(b) by 0 days.

(21) Appl. No.: 19/040,925

(22) Filed: Jan. 30, 2025

(65) Prior Publication Data

US 2025/0257797 A1      Aug. 14, 2025

(30) Foreign Application Priority Data

Feb. 12, 2024      (SE) .................................... 2450132-2

(51) Int. Cl.
G01C 21/34          (2006.01)
B60K 31/00          (2006.01)
(Continued)

(52) U.S. Cl.
CPC ..... F16H 61/0213 (2013.01); B60K 31/0058 (2013.01); F16H 59/44 (2013.01); F16H 59/58 (2013.01); F16H 59/66 (2013.01); G01C 21/3415 (2013.01); G01C 21/3492 (2013.01); F16H 2059/003 (2013.01)

(58) Field of Classification Search
CPC .......... F16H 59/44; F16H 59/58; F16H 59/66; F16H 2059/003; F16H 61/0213; B60K 31/0058; G01C 21/3415; G01C 21/3492
See application file for complete search history.

(56) References Cited

U.S. PATENT DOCUMENTS 9,630,611 B1 *    4/2017   Dufford ................. G01C 21/30
11,180,159 B1    11/2021   Post et al.
(Continued)

FOREIGN PATENT DOCUMENTS

EP          3244164 A2    11/2017
EP          3313705 B1    6/2023
(Continued)

OTHER PUBLICATIONS

Scania CV AB, Swedish Patent Application No. 2450132-2, Office Action, Sep. 12, 2024.

*Primary Examiner* — Edwin A Young
(74) *Attorney, Agent, or Firm* — Moore & Van Allen PLLC; W. Kevin Ransom

(57)          ABSTRACT

A control arrangement and a method for controlling a powertrain of a medium-duty or heavy-duty vehicle. The method includes a step of, in response to one or more driver-initiated indicators, adjusting a currently predicted route for the vehicle to a new predicted route, said new predicted route being predicted in consideration of information related to the one or more driver-initiated indicators. The method further includes a step of, determining a driving strategy for an upcoming road section of the new predicted route based on characteristics of said upcoming road section. Moreover, the method includes a step of controlling the powertrain in accordance with said determined driving strategy.

18 Claims, 3 Drawing Sheets

(51) Int. Cl.

| | |
|---|---|
| *F16H 59/44* | (2006.01) |
| *F16H 59/58* | (2006.01) |
| *F16H 59/66* | (2006.01) |
| *F16H 61/02* | (2006.01) |
| *F16H 59/00* | (2006.01) |

(56) References Cited

U.S. PATENT DOCUMENTS

| | | | |
|---|---|---|---|
| 11,378,404 B2 | 7/2022 | Manoliu et al. | |
| 2007/0156334 A1* | 7/2007 | Vu ...................... | G01C 21/3415 |
| | | | 340/995.23 |
| 2013/0274952 A1 | 10/2013 | Weslati et al. | |
| 2017/0146353 A1* | 5/2017 | Kroeller ............... | G08G 1/0969 |
| 2019/0170529 A1* | 6/2019 | Tseng ................. | G01C 21/3415 |
| 2021/0108929 A1* | 4/2021 | Zhang ................ | G01C 21/3438 |

FOREIGN PATENT DOCUMENTS

| | | | |
|---|---|---|---|
| JP | 5906987 | B2 | 4/2016 |
| WO | 2018171464 | A1 | 9/2018 |
| WO | 2023108455 | A1 | 6/2023 |

* cited by examiner

CONTROL ARRANGEMENT AND METHOD FOR CONTROLLING A POWERTRAIN OF A VEHICLE

CROSS-REFERENCE TO RELATED APPLICATIONS

This application claims priority to Swedish Patent Application No. 2450132-2 filed February 12. 2024, of the same title; the contents of which are hereby incorporated by reference.

TECHNICAL FIELD

The present disclosure relates in general to a method for controlling a powertrain of a medium-duty or heavy-duty vehicle. The present disclosure further relates in general to a control arrangement configured to control a powertrain of a medium-duty or heavy-duty vehicle.

The present disclosure also relates in general to a computer program and a computer-readable medium. Moreover, the present disclosure relates to a management system configured to control a transmission arrangement of a vehicle powertrain, a cruise control system and a vehicle.

BACKGROUND

Medium-duty and heavy-duty vehicles are today often equipped with various control systems configured to control the powertrain of the vehicle for various purposes, such as to improve safety, control travelling speed, reduce energy consumption, and/or improve driver comfort. Some of these control systems are configured plan a driving strategy for an upcoming road section of the vehicle, e.g., based on predicted future behavior of the vehicle if the vehicle is controlled according to different strategies. Such predictions, which may be determined through simulations and/or be based on historical data, may thereafter be used for the purpose of selecting a favorable driving strategy for the upcoming road section. The vehicle may thereafter be controlled in accordance with the selected driving strategy as the vehicle travels the relevant road section. These predictive control systems typically rely on identification of, and knowledge of the characteristics of, the upcoming road section, which may typically be determined through usage of various vehicle positioning systems (such as GPS) in combination with map data.

However, in some cases, the actual road section travelled by the vehicle may be different from the upcoming road section considered when planning the driving strategy. This may in turn lead to an inappropriate driving strategy being used for controlling the vehicle. Although the driving strategy is typically frequently reevaluated by such predictive control systems, and therefore may be altered upon recognition that the vehicle has entered a route deviating from the initially identified upcoming road section, the delayed alteration of the driving strategy may have a considerable negative impact on the operation of the medium-duty or heavy-duty vehicle. For example, in case the vehicle is controlled in accordance with a gear selection strategy determined based on a prediction that the vehicle will travel on a highway and the vehicle has in fact taken an exit immediately followed by a steep uphill, the gear selection strategy used by the control system may lead to a significant loss in available motive force for the vehicle. This may for example be perceived by a driver as very disturbing, and could even in worst case reduce road safety.

EP 3 244 164 A2 discloses a method of generating a horizon for use by an advanced driver assistance system (ADAS) of a vehicle. The method involves using stored digital location-based data, vehicle data and/or driver data to determine the likelihood that different outgoing paths are taken at a decision point along a currently traversed road segment, and deriving a probability that each path may be taken. The probability may be based on one or more of: an angle of the path relative to the incoming path, the road class of the path, a speed profile of the path, historical paths taken by vehicles at the decision point, and historical paths taken at the decision point by the individual driver or vehicle.

SUMMARY

The object of the present invention is to reduce the risk of a powertrain of a medium-duty or heavy-duty vehicle being controlled in accordance with a strategy that is unsuitable for the road section travelled by said vehicle.

The object is achieved by the subject-matter of the appended independent claim(s).

The present disclosure provides a method, performed by a control arrangement, for controlling a powertrain of a medium-duty or heavy-duty vehicle. The method comprises a step of, in response to one or more driver-initiated indicators, adjusting a currently predicted route for the vehicle to a new predicted route, said new predicted route being predicted in consideration of information related to the one or more driver-initiated indicators. The method further comprises a step of determining a driving strategy for an upcoming road section of the new predicted route based on characteristics of said upcoming road section. Moreover, the method comprises a step of controlling the powertrain in accordance with the determined driving strategy for the upcoming road section.

The herein described method increases the likelihood of using a suitable driving strategy when controlling a powertrain of a medium-duty or heavy-duty vehicle. This is achieved as a result of considering one or more actions taken by a driver of the vehicle, demonstrated as one or more driver-initiated indicators, when predicting the route to be taken by the vehicle. Through increasing the likelihood of accurately predicting the upcoming route of the vehicle, the accuracy in selecting the accurate upcoming road section for the vehicle inherently increases. Through knowledge of the upcoming road section, the characteristics thereof may be used when determining an appropriate driving strategy. Therefore, the herein described method reduces the risk of controlling the powertrain according to an unsuitable driving strategy decreases. Furthermore, the herein described method allows for predictive measures to be taken even before the vehicle deviates from a previously expected route.

The method may comprise a step of determining the one or more driver-initiated indicators based on (i) a detection of activation of turn signals of the vehicle, (ii) a detection of a steering wheel angle of the vehicle deviating from an expected steering wheel angle range of the vehicle, (iii) a detection of a lateral velocity of the vehicle deviating from an expected lateral velocity of the vehicle, and/or (iv) a detection of the vehicle approaching a geographical position where an alternative route, other than the currently predicted route, may be selected and the driver braking the vehicle in a manner judged to be consistent with the driver intending to select said alternative route. Such driver-initiated indicators may indicate that the driver intends to may a certain route selection and are therefore suitable for predicting the intention of the driver of the vehicle.

The driving strategy may comprise (or even be) a gear selection strategy for a transmission arrangement of the powertrain. A suitable gear selection strategy is particularly important for a medium-duty or heavy-duty vehicle, particularly in demanding driving situations such as in a steep uphill or downhill with a high vehicle load. Furthermore, it may in some cases be difficult to change to a more suitable gear quickly, for example for requiring multiple gear changes for arriving at the desired gear. This may for example in turn reduce driver comfort, make it more difficult to maintain a desired travelling speed, or even jeopardize road safety. The herein described method however allows for predictive gear selection strategies and therefore reduces the risk of an inappropriate gear selection, even in situations where the travelling speed of the vehicle is not actively controlled by a cruise control system.

Additionally, or alternatively, the driving strategy may comprise a targeted vehicle speed profile for the upcoming road section. This enables the method to be incorporated into the functions performed by a cruise control system of the medium-duty or heavy-duty vehicle. It also increases road safety (e.g., by enabling arriving at a suitable curve speed) and/or enables an energy efficient driving of the vehicle.

The method may further comprise a step of identifying one or more possible route options for the vehicle within a predetermined distance in front of the vehicle, and a step of predicting which one of the one or more identified possible route options is the most likely upcoming route selection for the vehicle and selecting said route option as the currently predicted route for the vehicle. This allows for predictively controlling the powertrain of the vehicle, and thereby facilitates meeting various desired effects, such as improved road safety, desired travelling speed of the vehicle, reduced energy consumption and/or improved driver comfort.

The step of predicting which one of the identified possible route options is the most likely upcoming route selection may for example be made based on data regarding historical route selections made by the vehicle and/or other road users, data regarding road characteristics of the identified possible route options, and/or data from a navigation system of the vehicle. This improves the accuracy in the prediction of the future route, and thus the upcoming road section of the vehicle, in the absence of any clear driver-initiated indicators which may demonstrate the intended route selection of the driver.

The present disclosure further relates to a computer program comprising instructions which, when executed by a computer, cause the computer to carry out the method as described above.

The present disclosure further relates to a computer-readable medium comprising instructions which, when executed by a computer, cause the computer to carry out the method as described above.

Moreover, the present disclosure provides a control arrangement configured to control a powertrain of a medium-duty or a heavy-duty vehicle. The control arrangement is configured to, in response to one or more driver-initiated indicators, adjust a currently predicted route for the vehicle to a new predicted route, said new predicted route being predicted in consideration of information related to the one or more driver-initiated indicators. The control arrangement is further configured to determine a driving strategy for an upcoming road section of the new predicted route based on characteristics of said upcoming road section. Moreover, the control arrangement is configured to control the powertrain in accordance with the determined driving strategy for the upcoming road section.

The control arrangement provides the same advantages as described above with regard to the corresponding method for controlling a powertrain of a medium-duty or heavy-duty vehicle.

The control arrangement may further be configured to determine the one or more driver-initiated indicators based on (i) a detection of activation of turn signals of the vehicle, (ii) a detection of a steering wheel angle of the vehicle deviating from an expected steering wheel angle range of the vehicle, (iii) a detection of a lateral velocity of the vehicle deviating from an expected lateral velocity of the vehicle, and/or (iv) a detection of the vehicle approaching a geographical position where an alternative route, other than the currently predicted route, may be selected and the driver braking the vehicle in a manner judged to be consistent with the driver intending to select said alternative route.

The control arrangement may be configured to identify one or more possible route options for the vehicle within a predetermined distance in front of the vehicle, and predict which one of the one or more identified possible route options is the most likely upcoming route selection and selecting said route option as the currently predicted route for the vehicle.

The present disclosure also relates to a management system configured to control a transmission arrangement of a medium-duty or heavy-duty vehicle powertrain, said management system comprising the control arrangement as described above.

Furthermore, the present disclosure relates to a cruise control system for a medium-duty or heavy-duty vehicle, said cruise control system comprising the control arrangement as described above. The medium-duty or heavy-duty vehicle is a land-based wheeled vehicle.

The present disclosure also relates to a medium-duty or heavy-duty vehicle comprising the control arrangement as described above. The vehicle may further comprise a management system configured to control a transmission arrangement of the powertrain of the vehicle and/or a cruise control system.

The medium-duty or heavy-duty vehicle may be a combustion engine driven vehicle. Alternatively, the medium-duty or heavy-duty vehicle may be a hybrid vehicle, a fully electric vehicle, or a fuel cell vehicle.

DETAILED DESCRIPTION

Figure 1:
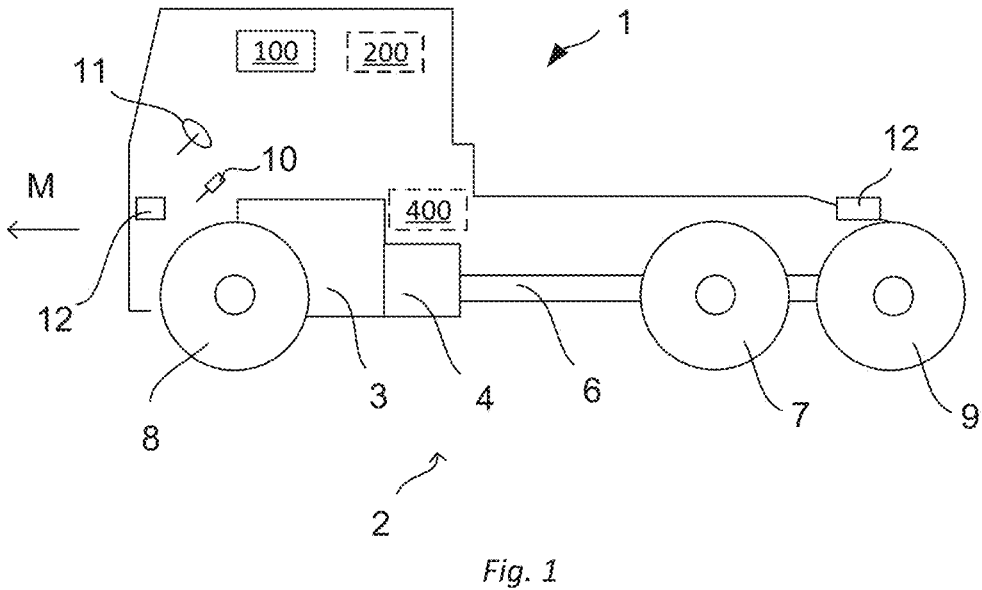
FIG. 1 schematically illustrates an example of a medium-duty or heavy-duty vehicle.

The invention will be described in more detail below with reference to exemplifying embodiments and the accompanying drawings. The invention is however not limited to the exemplifying embodiments discussed and/or shown in the drawings, but may be varied within the scope of the appended claims. Furthermore, the drawings shall not be considered drawn to scale as some features may be exaggerated in order to more clearly illustrate the invention or features thereof.

The term "route" is in the present disclosure used to describe a way taken, or to be taken, by the vehicle from a current geographical position to a known or unknown destination.

Moreover, the term "upcoming road section" is herein used to describe a section of the road in front of a vehicle, and which said vehicle is about to travel along a route. The upcoming road section may suitably be a road section starting immediately in front of the vehicle, but the present disclosure is not limited thereto. The upcoming road section may for example start a few meters in front of the vehicle.

A "driver" is in the present disclosure considered to encompass both a driver present onboard the vehicle as well as a person remotely controlling the operation of the vehicle (in real time), such as from a remote control center or the like.

The term "driver-initiated indicator" is herein considered to mean an indicator caused or generated by an action taken by a driver of the vehicle. This is in contrast to an indicator caused or generated by an action taken by a control system of the vehicle.

A powertrain of a medium-duty or heavy-duty typically comprises one or more power units (also known as propulsion units), and a transmission arrangement configured to selectively transfer (propulsion or braking) power from the one or more power units to one or more drive wheels of the vehicle. The transmission arrangement is typically a multi-speed transmission arrangement. The transmission may comprise one or more transmission units. The constituent components of such a powertrain may naturally be controlled in a numerous ways depending on the circumstances and it is therefore important to have an appropriate strategy therefore.

As mentioned above, it is previously known to include various types of control systems which are able to plan a suitable driving strategy for an upcoming road section using characteristics of said upcoming road section and thereafter use the planned driving strategy for the control of a medium-duty or heavy-duty vehicle (or parts thereof) to achieve a certain purpose, such as a desired speed and/or energy efficiency of the vehicle. However, one drawback is that only one single driving strategy can be utilized at each point in time and there may be a delay in the ability to adjust the driving strategy if it turns out that the vehicle is not travelling the road section for which the driving strategy was planned. Thus, it is very important to accurately predict which upcoming road section the vehicle will be travelling. The ability to do so is considerably improved by the herein described method for controlling a powertrain of a medium-duty or heavy-duty vehicle and the method also, in many cases, enables to alter the driving strategy already before the vehicle has started to travel a route which deviates from the initially predicted route.

The present disclosure relates to a method for controlling a powertrain of a medium-duty or heavy-duty vehicle. The method comprises a step of, in response to one or more driver-initiated indicators, adjusting a currently predicted route for the vehicle to a new predicted route (unless the new predicted route corresponds to the currently predicted route). The new predicted route is predicted in consideration of information related to the one or more driver-initiated indicators. The method further comprises a step of determining a driving strategy for an upcoming road section of the new predicted route based on characteristics of said upcoming road section. The method thereafter comprises a step of controlling the powertrain in accordance with the determined driving strategy for the upcoming road section. In other words, the method comprises a step of controlling the powertrain in accordance with the determined driving strategy as the vehicle continues to travel from the geographical position at which the upcoming road section starts.

One example of a driver-initiated indicator may be that the driver activates turn signals of the vehicle. The activation of turn signals implies that the driver intends to make a turn or change lane and may therefore indicate of a possible change of route, for example by taking an exit from a highway or turning in a crossing. The information related to such a driver-initiated indicator, to be used when predicting the new route, may be whether the activated turn signals indicate an intention to steer or turn the vehicle to the left or to the right.

Another example of a driver-initiated indicator may be that the driver steers the vehicle such that the steering angle deviates from an expected steering angle range of the vehicle. The expected steering angle range may for example correspond to an expected steering angle range for a lane currently travelled by the vehicle. When a current steering angle deviates from an expected steering angle range, this may indicate that the driver is about to leave a current lane of the road currently travelled by the vehicle, e.g. by taking an exit from a highway or turning in a crossing. The information related to such a driver-initiated indicator, to be used when predicting the new route, may be whether the steering angle indicates an intention to steer the vehicle to the left or the right.

Yet another example of a driver-initiated indicator may be that the driver steers the vehicle such that the lateral velocity of the vehicle deviates from an expected lateral velocity of the vehicle. The expected lateral velocity of the vehicle may for example correspond to the expected lateral velocity, obtained by the vehicle when travelling a current lane of the road. When a current lateral velocity of the vehicle deviates from an expected lateral velocity range, this indicates that the vehicle is about to leave the lane currently travelled by the vehicle. The information related to such a driver-initiated indicator, to be used when predicting the new route, may be whether the steering angle indicates an intention to steer the vehicle to the left or the right.

A further example of a driver-initiated indicator may be that the driver relatively slowly brakes the vehicle when approaching a geographical position at which an alternative route selection may be made, which may indicate that the driver intends to select the alternative route instead of continuing e.g., a currently predicted route. When the manner in which the driver brakes the vehicle when approaching said geographical position is consistent with an intention to select the alternative route, this may serve as an indicator of the driver's intent to select the alternative route. For the purpose of judging whether the manner in which is driver brakes the vehicle is consistent with selection of the alternative route, it may for example be considered whether the reduction of speed appears appropriate for making a turn to the alternative route (such as a highway exit or a turn at a crossing). For said purpose, the manner in which the driver brakes the vehicle may for example be compared with the vehicle speed reduction resulting from a curve speed function, similar to curve speed functions used in curve speed cruise control systems previously known. Alternatively, it may be judged whether there are alternative reasons for the driver braking the vehicle, such as road obstacles, traffic jam or the like, and if no such reasons can be identified, judging that the reason for the driver braking the vehicle is an intent to select the alternative route. The information related to such a driver-initiated indicator, to be used when predicting the new route, may e.g., be information of the alternative route deemed to be consistent with the manner the driver brakes the vehicle.

In accordance with a first alternative of the herein described method, only one of the above exemplified driver-initiated indicators is considered. In accordance with a second alternative, at least two of the above exemplified driver-initiated indicators are considered. For example, the likelihood that a driver will select an alternative route, such as a highway exit or turn at a crossing, is likely higher if the driver both activates the turn signals and brakes the vehicle. In case at least two of the exemplified driver-initiated indicators are considered, any possible combination of two, three, or all of the above exemplified driver-initiated indicators may be used in the herein described method.

In view of the foregoing, the herein described method may comprise a step of determining the one or more driver-initiated indicators based on (i) a detection of activation of turn signals of the vehicle, (ii) a detection of a steering wheel angle of the vehicle deviating from an expected steering wheel angle range of the vehicle, (iii) a detection of a lateral velocity of the vehicle deviating from an expected lateral velocity of the vehicle, and/or (iv) a detection of the vehicle approaching a geographical position where an alternative route, other than the currently predicted route, may be selected and the driver braking the vehicle in a manner judged to be consistent with the driver intending to select said alternative route.

The method may further comprise a step of predicting a new route in consideration of information related to the one or more driver-initiated indicators. To increase the likelihood that said prediction accurately reflects the intention of the driver of the vehicle, the prediction may naturally also take into account other factors such as data regarding historical route selections made by the vehicle and/or other road users, data regarding road characteristics of the identified possible route options, and/or data from a navigation system of the vehicle.

As previously mentioned, the herein described method comprises a step of determining a driving strategy for an upcoming road section of the new predicted route based on characteristics of said upcoming road section. The characteristics of the upcoming road section may suitably comprise at least topography and curvature of the upcoming road section. The characteristics of the upcoming road section could also include for example legal speed limits and/or traffic situation, if desired.

The above mentioned driving strategy for the upcoming road section may suitably comprise at least a gear selection strategy for a transmission arrangement of the powertrain. Such a transmission arrangement may comprise one or more transmission units. In some cases, for example when the powertrain is not controlled by a cruise control system of the vehicle, the driving strategy may even consist of a gear selection strategy for the transmission arrangement of the powertrain. One specific example of when the driving strategy may consist of a gear selection strategy is when the herein described method is applied by a transmission management system configured to predictively control an automated manual transmission (AMT) of a medium-duty or heavy-duty vehicle.

Additionally, or alternatively, the above mentioned driving strategy for the upcoming road section may comprise a targeted vehicle speed profile for the upcoming road section.

The herein described method may further comprise a step of identifying one or more possible route options for the vehicle within a predetermined distance in front of the vehicle. Said step may be performed based on data relating to the geographical position of the vehicle in combination with map data. Data regarding the geographical position of the vehicle may be determined in accordance with conventional methods therefore, such as by means of a global positioning system (GPS). The predetermined distance in front of the vehicle could for example be at least 300 meters, at least 500 meters, or at least 1 km.

Moreover, the method may comprise a step of predicting which one of the one or more identified possible route options is the most likely upcoming route selection for the vehicle and selecting said route option as the currently predicted route. If only one route option has been identified, said route option would naturally be the most likely upcoming route selection. The prediction of which of the identified possible route options is the most likely upcoming route selection may for example be made based on data regarding historical route selections made by the vehicle and/or other road users (the latter including data regarding traffic flow). Alternatively, or additionally, the prediction of which of the possible route options is the most likely upcoming route selection may be made based on data regarding road characteristics of the identified possible route options. Additionally, or alternatively, said prediction may be made based on data from a navigation system of the vehicle. Such data from the navigation system may for example comprise a planned route for the vehicle. The method may further comprise a step of determining a driving strategy for an upcoming road section of the currently predicted route and thereafter control the powertrain in accordance with said driving strategy, unless the currently predicted route is altered to a new predicted route.

Determining a driving strategy for an upcoming road section (of the currently predicted route or the new predicted route) may be performed in accordance with previously known methods therefore. For example, the driving strategy may be determined by simulating vehicle behavior if controlled according to various driving strategies for the upcoming road section, and selecting the driving strategy corresponding to the simulation giving the most favorable result, e.g., in terms of energy efficiency.

The performance of the herein described method for controlling a powertrain of a medium-duty or heavy-duty vehicle may be governed by programmed instructions. These programmed instructions may take the form of a computer program which, when executed by a computer, cause the computer to effect desired forms of control action. Such a computer may for example be comprised in the control arrangement as described herein. A computer is in the present disclosure considered to mean any hardware or hardware/firmware device implemented using processing circuity such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, an application-specific integrated circuit, or any other device capable of electronically performing operations in a defined manner.

The above described programmed instructions, which may take the form of a computer program, may be stored on a computer-readable medium. Hence, the present disclosure also relates to a computer-readable medium storing instructions, which when executed by computer, cause the computer to carry out the herein described method for controlling a powertrain of a medium-duty or heavy-duty vehicle. The computer-readable medium may be a non-transitory computer-readable medium, such as a tangible electronic, magnetic, optical, infrared, electromagnetic, and/or semiconductor system, apparatus, and/or device.

The present disclosure further relates to a control arrangement configured to control a powertrain of a medium-duty or heavy-duty vehicle. The control arrangement may be configured to perform any one of the steps of the method for controlling a powertrain of a medium-duty or heavy-duty vehicle as described above.

More specifically, in accordance with the present disclosure, a control arrangement configured to control a powertrain of a medium-duty or heavy-duty vehicle is provided. The control arrangement is configured to, in response to one or more driver-initiated indicators, adjust a currently predicted route for the vehicle to a new predicted route. Said new predicted route is predicted in consideration of information related to the one or more driver-initiated indicators. The control arrangement is further configured to determine a driving strategy for an upcoming road section of the new predicted route based on characteristics of said upcoming road section. Moreover, the control arrangement is configured to control the powertrain in accordance with the determined driving strategy for the upcoming road section.

The control arrangement may comprise one or more control units. In case of the control arrangement comprising a plurality of control units, each control unit may be configured to control a certain function/step or a certain function/step may be divided between more than one control units. The control arrangement may be a control arrangement of the powertrain of the vehicle. The control arrangement may for example be comprised in a management system configured to control a transmission arrangement of the medium-duty or heavy-duty vehicle. Alternatively, the control arrangement may be any other control arrangement of the vehicle but configured to communicate with powertrain for the purpose of performing the herein described method.

The present disclosure also relates to a cruise control system for the medium-duty or heavy-duty vehicle, more specifically a predictive cruise control system for such a vehicle. The cruise control system may be configured to control the powertrain of the vehicle in accordance with a driving strategy for an upcoming road section. Such a driving strategy may for example be represented by a targeted vehicle speed profile, which in turn may be achieved through control of the constituent components of the powertrain (such as at least one or more power units and a transmission arrangement) of the vehicle.

FIG. 1 schematically illustrates an example of a medium-duty or a heavy-duty vehicle 1, here illustrated as a tractor truck. The vehicle 1 comprises a powertrain 2 including at least one power unit 3. The at least one power unit 3 may for example be combustion engine or an electrical machine. The powertrain 2 further comprises a transmission arrangement 4 configured to transmit (propulsion or braking) power, at different gear rations, from the at least one power unit 3 to one or more drive wheels 7 of the vehicle 1. The transmission arrangement 4 may be connected to the one or more drive wheels 7 via an output shaft 6 of the transmission arrangement 4. Said output shaft 6 as well as the one or more drive wheels 7 are constituent components of the powertrain 2. The primary direction of travel of the vehicle 1, i.e. the direction when the vehicle is travelling forward, is in the figure illustrated by the arrow M.

The vehicle 1 further comprises front wheels 8. The front wheels 8 are steered wheels. The vehicle 1 may further comprise a steering wheel 11. The steering wheel 11 may be operated by a driver of the vehicle 1 for the purpose of steering the vehicle. The vehicle 1 may further comprise tag axle wheels 9, if desired.

The vehicle 1 may comprise a brake pedal 10 configured to be operated by a driver of the vehicle for the purpose of braking the vehicle 1.

The vehicle 1 may further comprise turn signals 12 (also known as e.g., directional signals or blinkers). The turn signals 12 may be arranged on each lateral side of the vehicle 1, at the front and at the rear of the vehicle. The turn signals 12 may be configured to be operated by a driver of the vehicle 1 for the purpose of signaling to other road users that the driver intends to turn to the left or to the right as seen in a direction of travel of the vehicle.

The vehicle 1 further comprises a control arrangement 100 configured to control the powertrain 2 of the vehicle 1. The control arrangement 100 may be configured to control the powertrain 2 in accordance with the herein described method for controlling a powertrain of a medium-duty or heavy-duty vehicle.

The vehicle 1 may typically also comprise a management system 400 configured to control the transmission arrangement 4. Said management system 400 may be configured to control the transmission arrangement in accordance with a gear selection strategy, which in turn may be selected in dependence of characteristics of an upcoming road section of the vehicle 1.

The vehicle 1 may further comprise a cruise control system 200 configured to control the travelling speed of the vehicle 1. Said cruise control system 200 may suitably be a predictive cruise control system, i.e. a cruise control system configured to use characteristics of an upcoming road section of the vehicle for planning a driving strategy for said upcoming road section and thereafter control the powertrain in accordance with said planned driving strategy.

The control arrangement 100 described above may be comprised in either one of the cruise control system 200 or the management system 400. Alternatively, as shown in the figure, the control arrangement 100 may be separate from the cruise control system 200 and the management system 400. In such a case, the control arrangement 100 may be configured to communicate with the cruise control system 200 and/or the management system 400 for the purpose of performing the herein described method.

Figure 2:
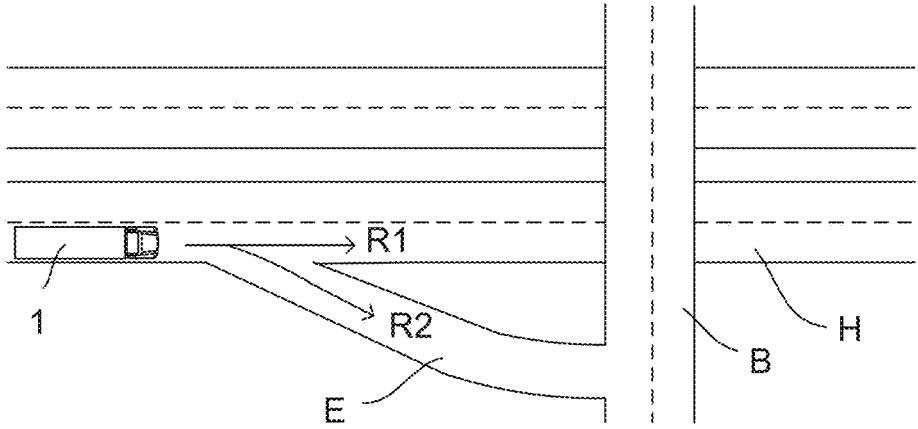
FIG. 2 illustrates one example of a driving situation where a medium-duty or heavy-duty vehicle approaches a geographical position where a driver of the vehicle may select between two route options.

FIG. 2 illustrates one example of a driving situation where a medium-duty or heavy-duty vehicle 1 approaches a geographical position where a driver of the vehicle 1 may select a first route option R1 or a second route option R2. In the illustrated example, the vehicle 1 is currently travelling on a highway H, having an exit E. The exit E leads to a bridge B over the highway H, which means that the exit E represents an incline. The first route option R1 may, in accordance with the herein described method, for example be predicted to be the most likely route selection in view of the historical traffic flow. In other words, the first route option R1, represented by continued travel on the highway H, may be predicted to be the most likely route selection for the vehicle in view of most road users having selected said route option R1 in contrast to the route option R2. Thus, route option R1 may represent the currently predicted route for the vehicle and the driving strategy for an upcoming road section of the vehicle may therefore be determined based on the characteristics of the upcoming road section of the highway H.

However, in case the driver of the vehicle 1 would instead decide to select route option R2 and thus exit the highway H, the driving strategy used for controlling the powertrain of the vehicle 1 may not be suitable for the turning into the exit and the subsequent incline of the exit. The driver of the vehicle may, in view of intending to select the route R2, decide to brake the vehicle to ensure that the vehicle may safely turn onto the exit E, activate turn signals of the vehicle 1 to inform other road users of the intended route selection, and/or steer slightly towards the upcoming exit (which in turn may lead to an alteration of the steering wheel angle and/or a change of the lateral velocity of the vehicle). The herein described method utilizes said actions of the driver for the purpose of adjusting the currently predicted route to a new predicted route (which according to the example would be R2) and planning a driving strategy for the new predicted route before the route is actually travelled by the vehicle 1. In the present example, alteration of the driving strategy may for example comprise a different gear selection strategy as well as a different targeted speed profile (in case the vehicle speed is controlled according to a targeted speed profile by means of a cruise control system of the vehicle). Thereby, it is ensured that the powertrain of the vehicle is controlled according to an appropriate driving strategy for the upcoming road section of the new predicted route R2. Thereby, the delay in change of driving strategy which, according to previously known methods, may occur as a result of having to wait until the control arrangement determines that the vehicle is no longer travelling the currently predicted route may be avoided.

Figure 3:
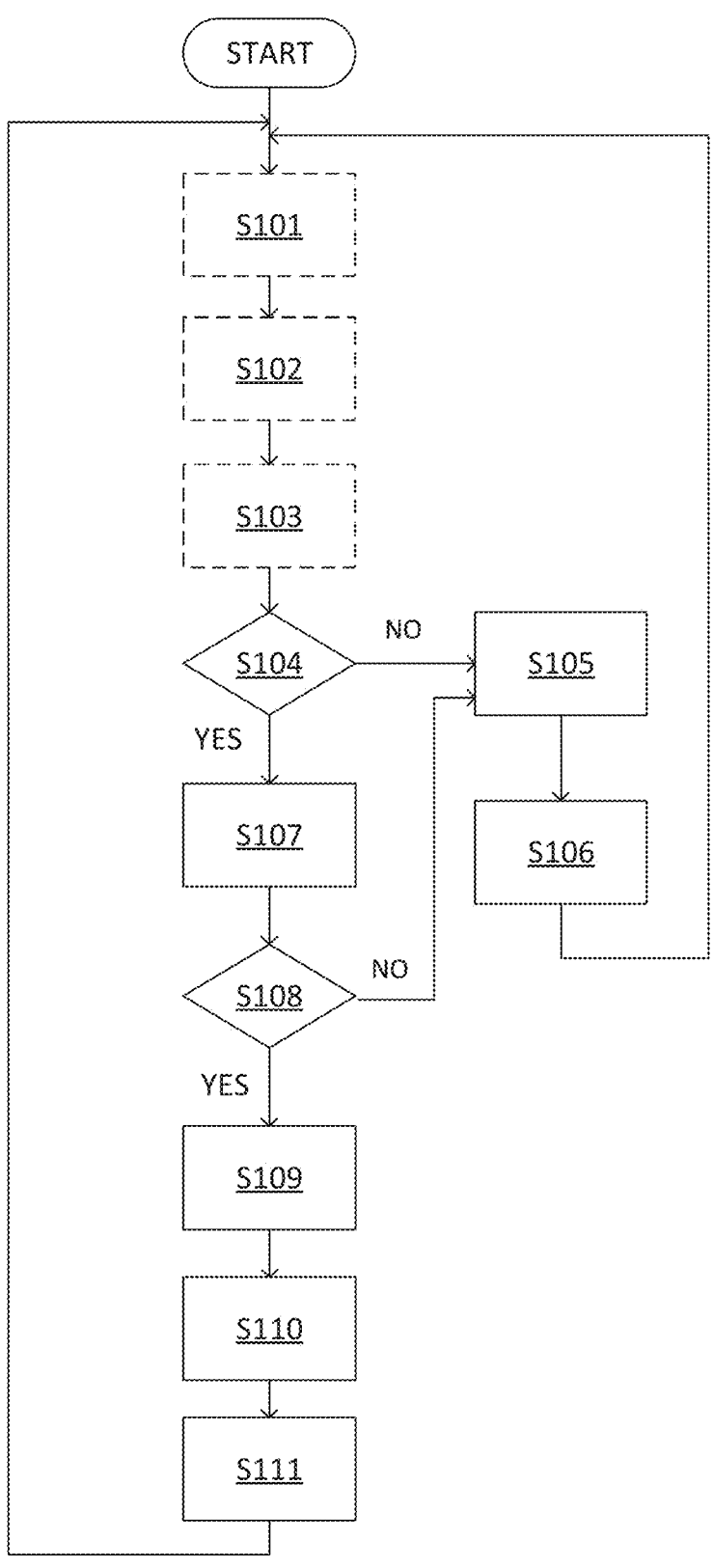
FIG. 3 represents a flowchart schematically illustrating one exemplifying embodiment of the herein described method for controlling a powertrain of a medium-duty or heavy-duty vehicle, FIG. 4 schematically illustrates an exemplifying embodiment of a device which may comprise, consist of, or be comprised in a control arrangement configured to perform the herein described method for controlling a powertrain of a medium-duty or heavy-duty vehicle.

FIG. 3 represents a flowchart schematically illustrating one exemplifying embodiment of the herein described method for controlling a powertrain of a medium-duty or heavy-duty vehicle. Optional steps of the exemplifying embodiment are illustrated by dashed lines in the figure.

The method may for example be initiated upon setting the vehicle in motion from standstill. Alternatively, the method may for example be initiated upon activation of a cruise control system of the vehicle.

The method may comprise a step S101 of identifying one or more possible route options for the vehicle within a predetermined distance in front of the vehicle.

The method may further comprise a step S102 of predicting which of the identified possible route option(s), obtained from step S101, is the most likely upcoming route selection for the vehicle. In other words, step S102 comprises predicting which of the identified possible routes a driver of the vehicle will select when operating the vehicle.

The method may thereafter comprise a step S103 of selecting the route option, predicted in step S102 to be the most likely route selection, as the currently predicted route for the vehicle.

It should here be noted that in case a currently predicted route has already been determined when the method is initiated, the initial steps S101-S103 can be omitted and are therefore optional.

The method comprises a step S104 of determining whether one or more driver-initiated indicators has/have been generated and thus may be detected. If no such driver-initiated indicator can be detected, the method may proceed to a step S105 of determining a driving strategy for an upcoming road section of the currently predicted route and a step S106 of controlling the powertrain in accordance with said driving strategy. The method may thereafter be reverted to start and thereby repeated. It should here be noted that the when the method is repeated, the vehicle may typically have travelled a certain distance from the geographical position at which the method was initially started. Thus, it may be appropriate to include steps S101-S103 when the method is repeated.

However, in case it is determined in step S104 that one or more driver-initiated indicators has/have been generated (and thus may be detected), the method comprises a step S107 of predicting a new (predicted) route in consideration of information related to the one or more driver-initiated indicators. Said prediction may further take into account data regarding historical route selections made by the vehicle and/or other road users, data regarding road characteristics of the identified possible route options, and/or data from a navigation system of the vehicle, but priority may be given to the information related to the one or more driver-initiated indicators.

The method may further comprise a step S108 of determining whether the new predicted route deviates from the currently predicted route. In case the new predicted route corresponds to the currently predicted route, the method may proceed to step S105.

However, in case it is determined in step S108 that the new predicted route deviates from the currently predicted route, the method proceeds to a step S109 of adjusting the currently predicted route to the new predicted route.

After, or in parallel with, step S109, the method further comprises a step S110 of determining a driving strategy for an upcoming road section of the new predicted route based on characteristics of said upcoming road section.

The method further comprises a step S111 of controlling the powertrain in accordance with driving strategy determined in step S110. The method may thereafter revert to start and thereby repeated. It should here be noted that, when the method is returned to start, the new predicted route would as a result of step S109 constitute a currently predicted route when restarting the method. Moreover, as mentioned above, when the method is repeated, the vehicle may typically have travelled a certain distance from the geographical position at which the method was initially started. Thus, it may be appropriate to include steps S101-S103 when the method is repeated.

Figure 4:
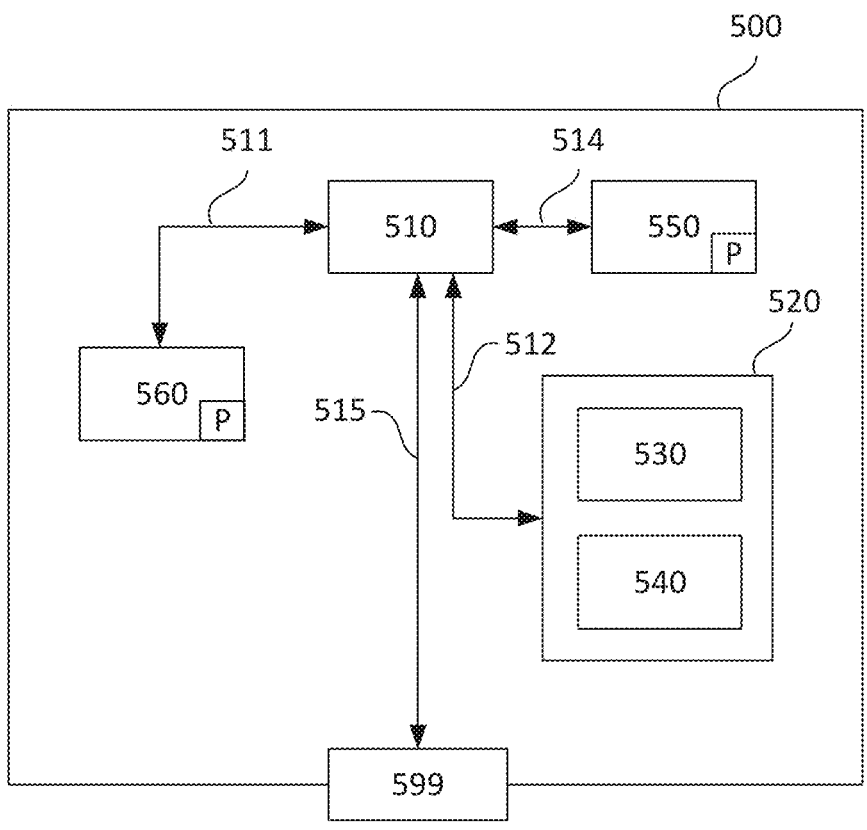

FIG. 4 schematically illustrates an exemplifying embodiment of a device 500. The control arrangement 100 described above may for example comprise the device 500, consist of the device 500, or be comprised in the device 500.

The device 500 comprises a non-volatile memory 520, a data processing unit 510 and a read/write memory 550. The non-volatile memory 520 has a first memory element 530 in which a computer program, e.g. an operating system, is stored for controlling the function of the device 500. The device 500 further comprises a bus controller, a serial communication port, I/O means, an A/D converter, a time and date input and transfer unit, an event counter and an interruption controller (not depicted). The non-volatile memory 520 has also a second memory element 540.

There is provided a computer program P that comprises instructions for controlling a powertrain of a medium-duty or heavy-duty vehicle. The computer program comprises instructions for, in response to one or more driver-initiated indicators, adjusting a currently predicted route for the vehicle to a new predicted route, said new predicted route being predicted in consideration of information related to the one or more driver-initiated indicators. The computer program further comprises instructions for determining a driving strategy for an upcoming road section of the new predicted route based on characteristics of said upcoming road section. Moreover, the computer program comprises instructions for controlling the powertrain in accordance with the determined driving strategy for the upcoming road section.

The program P may be stored in an executable form or in a compressed form in a memory 560 and/or in a read/write memory 550.

The data processing unit 510 may perform one or more functions, i.e. the data processing unit 510 may effect a certain part of the program P stored in the memory 560 or a certain part of the program P stored in the read/write memory 550.

The data processing device 510 can communicate with a data port 599 via a data bus 515. The non-volatile memory 520 is intended for communication with the data processing unit 510 via a data bus 512. The separate memory 560 is intended to communicate with the data processing unit 510 via a data bus 511. The read/write memory 550 is adapted to communicate with the data processing unit 510 via a data bus 514. The communication between the constituent components may be implemented by a communication link. A communication link may be a physical connection such as an optoelectronic communication line, or a non-physical connection such as a wireless connection, e.g. a radio link or microwave link.

When data are received on the data port 599, they may be stored temporarily in the second memory element 540. When input data received have been temporarily stored, the data processing unit 510 is prepared to effect code execution as described above.

Parts of the methods herein described may be effected by the device 500 by means of the data processing unit 510 which runs the program stored in the memory 560 or the read/write memory 550. When the device 500 runs the program, methods herein described are executed.

The invention claimed is:

1. A method, performed by a control arrangement, for controlling a powertrain of a vehicle, the method comprising:

in response to one or more driver-initiated indicators, adjusting a currently predicted route for the vehicle to a new predicted route, said new predicted route being predicted in consideration of information related to the one or more driver-initiated indicators;

determining a driving strategy for an upcoming road section of the new predicted route based on characteristics of said upcoming road section; and controlling the powertrain in accordance with the determined driving strategy for the upcoming road section.

2. The method according to claim 1, further comprising:

determining the one or more driver-initiated indicators based on:

(i) a detection of activation of turn signals of the vehicle;

(ii) a detection of a steering wheel angle of the vehicle deviating from an expected steering wheel angle range of the vehicle;

(iii) a detection of a lateral velocity of the vehicle deviating from an expected lateral velocity of the vehicle; and/or (iv) a detection of the vehicle approaching a geographical position where an alternative route, other than the currently predicted route, may be selected and the driver braking the vehicle in a manner judged to be consistent with the driver intending to select said alternative route.

3. The method according to claim 1, wherein the driving strategy comprises a gear selection strategy for a transmission arrangement of the powertrain.

4. The method according to claim 1, wherein the driving strategy comprises a targeted vehicle speed profile for the upcoming road section.

5. The method according to claim 1, further comprising:

identifying one or more possible route options for the vehicle within a predetermined distance in front of the vehicle; and predicting which one of the one or more identified possible route options is the most likely upcoming route selection for the vehicle; and selecting said route option as the currently predicted route for the vehicle.

6. The method according to claim 5, wherein predicting which one of the identified possible route options is the most likely upcoming route selection is made based on:

(i) data regarding historical route selections made by the vehicle and/or other road users;

(ii) data regarding road characteristics of the identified possible route options; and/or (iii) data from a navigation system of the vehicle.

7. A computer program product stored on a non-transitory computer-readable medium, said computer program product for controlling a powertrain of a vehicle, wherein said computer program product comprising computer instructions to cause one or more computing devices to:

in response to one or more driver-initiated indicators, adjust a currently predicted route for the vehicle to a new predicted route, said new predicted route being predicted in consideration of information related to the one or more driver-initiated indicators;

determine a driving strategy for an upcoming road section of the new predicted route based on characteristics of said upcoming road section; and control the powertrain in accordance with the determined driving strategy for the upcoming road section.

8. The computer program product according to claim 7, wherein said computer program product comprising computer instructions to cause one or more computing devices to:

determine the one or more driver-initiated indicators based on:

(i) a detection of activation of turn signals of the vehicle;

(ii) a detection of a steering wheel angle of the vehicle deviating from an expected steering wheel angle range of the vehicle;

(iii) a detection of a lateral velocity of the vehicle deviating from an expected lateral velocity of the vehicle; and/or (iv) a detection of the vehicle approaching a geographical position where an alternative route, other than the currently predicted route, may be selected and the driver braking the vehicle in a manner judged to be consistent with the driver intending to select said alternative route.

9. The computer program product according to claim 7, wherein said computer program product comprising computer instructions to cause one or more computing devices to:

identify one or more possible route options for the vehicle within a predetermined distance in front of the vehicle;

predict which one of the one or more identified possible route options is the most likely upcoming route selection for the vehicle; and select said route option as the currently predicted route for the vehicle.

10. The computer program product according to claim 9, wherein said selection of said route option as the currently predicted route for the vehicle is made based on:

(i) data regarding historical route selections made by the vehicle and/or other road users;

(ii) data regarding road characteristics of the identified possible route options; and/or (iii) data from a navigation system of the vehicle.

11. A control arrangement configured to control a powertrain of a vehicle, the control arrangement being configured to:

in response to one or more driver-initiated indicators, adjust a currently predicted route for the vehicle to a new predicted route, said new predicted route being predicted in consideration of information related to the one or more driver-initiated indicators;

determine a driving strategy for an upcoming road section of the new predicted route based on characteristics of said upcoming road section; and control the powertrain in accordance with the determined driving strategy for the upcoming road section.

12. The control arrangement according to claim 11, further configured to:

determine the one or more driver-initiated indicators based on:

(i) a detection of activation of turn signals of the vehicle;

(ii) a detection of a steering wheel angle of the vehicle deviating from an expected steering wheel angle range of the vehicle;

(iii) a detection of a lateral velocity of the vehicle deviating from an expected lateral velocity of the vehicle; and/or (iv) a detection of the vehicle approaching a geographical position where an alternative route, other than the currently predicted route, may be selected and the driver braking the vehicle in a manner judged to be consistent with the driver intending to select said alternative route.

13. The control arrangement according to claim 11, further configured to:

identify one or more possible route options for the vehicle within a predetermined distance in front of the vehicle; and predict which one of the one or more identified possible route options is the most likely upcoming route selection and selecting said route option as the currently predicted route for the vehicle.

14. The control arrangement according to claim 11, further configured to:

identify one or more possible route options for the vehicle within a predetermined distance in front of the vehicle;

predict which one of the one or more identified possible route options is the most likely upcoming route selection for the vehicle; and select said route option as the currently predicted route for the vehicle.

15. The control arrangement according to claim 14, wherein said selection of said route option as the currently predicted route for the vehicle is made based on:

(i) data regarding historical route selections made by the vehicle and/or other road users;

(ii) data regarding road characteristics of the identified possible route options; and/or (iii) data from a navigation system of the vehicle.

16. A management system configured to control a transmission arrangement of a vehicle powertrain, said management system comprising a control arrangement configured to:

in response to one or more driver-initiated indicators, adjust a currently predicted route for the vehicle to a new predicted route, said new predicted route being predicted in consideration of information related to the one or more driver-initiated indicators;

determine a driving strategy for an upcoming road section of the new predicted route based on characteristics of said upcoming road section; and control the powertrain in accordance with the determined driving strategy for the upcoming road section.

17. A cruise control system comprising a control arrangement configured to control a powertrain of a vehicle and configured to:

in response to one or more driver-initiated indicators, adjust a currently predicted route for the vehicle to a new predicted route, said new predicted route being predicted in consideration of information related to the one or more driver-initiated indicators;

determine a driving strategy for an upcoming road section of the new predicted route based on characteristics of said upcoming road section; and control the powertrain in accordance with the determined driving strategy for the upcoming road section.

18. A vehicle comprising a control arrangement configured to control a powertrain of the vehicle and configured to:

in response to one or more driver-initiated indicators, adjust a currently predicted route for the vehicle to a new predicted route, said new predicted route being predicted in consideration of information related to the one or more driver-initiated indicators;

determine a driving strategy for an upcoming road section of the new predicted route based on characteristics of said upcoming road section; and control the powertrain in accordance with the determined driving strategy for the upcoming road section.

* * * * *